United States Patent
Kaminsky et al.

(10) Patent No.: US 6,844,047 B2
(45) Date of Patent: Jan. 18, 2005

(54) OPTICAL ELEMENT CONTAINING NANOCOMPOSITE MATERIALS

(75) Inventors: Cheryl J. Kaminsky, Rochester, NY (US); Narasimharao Dontula, Rochester, NY (US); Debasis Majumdar, Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/266,181

(22) Filed: Oct. 7, 2002

(65) Prior Publication Data

US 2004/0067338 A1 Apr. 8, 2004

(51) Int. Cl.[7] .................................................. B32B 3/26
(52) U.S. Cl. ....................... 428/141; 428/143; 428/338; 428/332; 428/913; 428/150; 428/331; 428/149; 359/599
(58) Field of Search ................................ 428/141, 143, 428/338, 332, 913, 150, 331, 149; 359/599

(56) References Cited

U.S. PATENT DOCUMENTS

| 3,793,058 | A | * | 2/1974 | Rostoker ................. 220/2.1 R |
| 4,140,369 | A | * | 2/1979 | Howland .................... 359/452 |
| 4,436,377 | A | * | 3/1984 | Miller ........................ 349/114 |
| 5,361,163 | A | * | 11/1994 | Matsuda et al. ............ 359/452 |
| 5,430,566 | A | * | 7/1995 | Sakaya et al. .............. 349/118 |
| 5,552,907 | A | * | 9/1996 | Yokota et al. ................ 349/62 |
| 5,830,528 | A | * | 11/1998 | Beall et al. ................. 427/220 |
| 5,903,391 | A | * | 5/1999 | Toshima et al. ............ 359/599 |
| 5,981,126 | A | | 11/1999 | Majumdar et al. |
| 6,034,163 | A | | 3/2000 | Barbee et al. |
| 6,093,521 | A | | 7/2000 | Laney et al. |
| 6,177,153 | B1 | | 1/2001 | Uchiyama et al. |
| 6,258,142 | B1 | * | 7/2001 | Holt et al. .................... 55/378 |
| 6,266,476 | B1 | | 7/2001 | Shie et al. |

* cited by examiner

*Primary Examiner*—William P. Watkins, III
(74) *Attorney, Agent, or Firm*—Arthur E. Kluegel

(57) ABSTRACT

Disclosed is an optical element comprising substrate with a surface feature having a roughness average (Ra) of from 1 to 200 micrometers containing a dispersion of minute layered particulates in a polymer binder.

64 Claims, No Drawings

OPTICAL ELEMENT CONTAINING NANOCOMPOSITE MATERIALS

CROSS REFERENCE TO RELATED APPLICATIONS

This application is one of a group of five related commonly assigned applications co-filed herewith as Ser. No. 10/265,974 filed Oct. 7, 2002 currently pending, Ser. No. 10/266,176, filed Oct. 7, 2002 currently pending, Ser. No. 10/265,982 filed Oct. 7, 2002 now abandoned, Ser. No. 10/266,181 filed Oct. 7, 2002 now allowed, and Ser. No. 10/265,552 filed Oct. 7, 2002 now U.S. Pat. No. 6,641,973, the contents of which are incorporated herein by reference.

FIELD OF THE INVENTION

The invention relates to an optical element comprising a substrate with a surface feature having a roughness average (Ra) of from 1 to 200 micrometers containing a dispersion of minute layered particulates in a polymer binder. In a preferred form, the invention relates to an optical element to manage illumination light for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from two major drawbacks: a high degree of backscattering and the need for air contact. Backscattering causes reflection of a significant portion of the light back to the originating source when it should properly pass through the diffuser, lowering the efficiency of the optical system. The second drawback, the requirement that the rough surface must be in contact with air to operate properly, may also result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where an embedded diffuser may be desirable, where the first type of diffuser would not be appropriate. For example, a diffuser layer could be embedded between the output polarizer layer and an outer hardcoat layer of a liquid crystal display system to protects the diffuser from damage. Additionally, a diffuser having a thin profile, which will retain wide optical scattering power when embedded in other materials and have low optical backscatter and therefore higher optical efficiencies than conventional diffusers, would be highly desirable.

U.S. Pat. No. 6,093,521 describes a photographic member comprising at least one photosensitive silver halide layer on the top of said member and at least one photosensitive silver halide layer on the bottom of said member, a polymer sheet comprising at least one layer of voided polyester polymer and at least one layer comprising nonvoided polyester polymer, wherein the imaging member has a percent transmission of between 38 and 42%. While the voided layer described in U.S. Pat. No. 6,093,521 does diffuse back illumination utilized in prior art light boxes used to illuminate static images, the percent transmission between 38 and 42% would not allow a enough light to reach an observers eye for a liquid crystal display. Typically, for liquid crystal display devices, back light diffusers must be capable of transmitting at least 65% and preferably at least 80% of the light incident on the diffuser.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission which is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

The need for having a thinner and stiffer base for imaging products is well recognized. In addition to providing cost advantage, thinner supports can fulfill many other criteria. For example, in motion picture and related entertainment industry, thinner photographic base allows for longer film footage for the same sized reels. However, a reduction in thickness of the base typically results in a reduction in stiffness, which can have detrimental effects in terms of curl, transport, and durability. For electronic display materials, such as liquid crystal display, it is desirable that the components be light in weight and flexible.

Recently, nanocomposite materials prepared using smectite clays have received considerable interest from industrial sectors, such as the automotive industry and the packaging industry, for their unique physical properties. These properties include improved heat distortion characteristics, barrier properties, and mechanical properties. The related prior art is illustrated in U.S. Pat. Nos. 4,739,007; 4,810,734; 4,894,411; 5,102,948; 5,164,440; 5,164,460; 5,248,720; 5,854,326, 6,034,163. However, the use of these nanocomposites in imaging materials for stiffer and thinner support has not been recognized in the aforementioned patents.

In order to obtain stiffer polymeric supports using smectite clays, the clays need to be intercalated or exfoliated in the polymer matrix. There has been a considerable effort put towards developing methods to intercalate the smectite clays and then compatibilize with thermoplastic polymer. This is because the clay host lattice is hydrophilic, and it must be chemically modified to make the platelet surfaces organophilic in order to allow it to be incorporated in the polymer. To obtain the desired polymer property enhancements, all the intercalation techniques developed so far are batch processes, time consuming and lead to increasing the overall product cost.

There are two major intercalation approaches that are generally used—intercalation of a suitable monomer followed by polymerization (known as in-situ polymerization, see A. Okada et. Al., *Polym Prep. Vol.* 28, 447, 1987) or monomer/polymer intercalation from solution. Polyvinyl alcohol (PVA), polyvinylpyrrolidone (PVP) and polyethylene oxide (PEO) have been used to intercalate the clay platelets with marginal success. As described by Levy et. al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorrilonite", *Journal of Colloid Science*, Vol. 18, 647–664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute intercalated layered materials or particulates. In a recent work by Richard Vaia et.al., "New Polymer Electrolyte Nanocomposites: Melt intercalation of polyethyleneoxide in mica type silicates", *Adv. Materials,* 7(2), 154–156, 1995, PEO was intercalated into Na-montmorillonite and Li-montmorillonite by heating to 80° C. for 2–6 hours to achieve a d-spacing of 17.7 Å. The extent of intercalation observed was identical to that obtained from solution (V. Mehrotra, E. P. Giannelis, *Solid State Commun.,* 77, 155, 1991). Other, recent work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalant monomer that contains an amine or amide functionality or mixtures thereof. In both these patents and other patents issued to the same group the intercalation is performed at very dilute clay concentrations in an intercalant carrier like water. This leads to a necessary and costly drying step, prior to intercalates being dispersed in a polymer. Disclosed in WO 93/04118 is the intercalation process based on adsorption of a silane coupling agent or an onium cation such as a quaternary ammonium compound having a reactive group that is compatible with the matrix polymer.

There are difficulties in intercalating and dispersing smectite clays in thermoplastic polymers. This invention provides a technique to overcome this problem. It also provides an article with improved dispersion of smectite clays that can be incorporated in a web.

Prior art optical elements which include light diffusers, light directors, light guides, brightness enhancement films and polarizing films typical comprise a repeating ordered geometrical pattern or random geometrical pattern. The geometrical patterns typically have a single size distribution in order to accomplish the intended optical function. An example is a brightness enhancement film for LC displays utilizing precise micro prisms. The micro prism geometry has a single size distribution across the sheet and when utilized with a polarizing sheet, the top of the micro prisms are in contact with the polarizing sheet. When these prior art optical elements are used as a system, as is the case in a liquid crystal display, the optical elements are typically in optical contact. The focal length of the prior art optical elements, in combination with other optical elements, typically comprise the thickness of the optical element.

Prior art optical spacer materials typically comprise thin, transparent polymer sheets to provide optical spacing between two optical components. Optical spacer materials are utilized to change the focal length of an optical component or to provide protection between two optical components. It would be desirable for an optical component to contain an integral optical spacer.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. While the materials disclosed in U.S. Pat. No. 6,266,476 shape and collimate light and therefore are not efficient diffusers of light particularly for liquid crystal display devices. Further, the micro-structures are of a single size distribution.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

The U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

SUMMARY OF THE INVENTION

The invention provides an optical comprising a substrate with a surface feature having a roughness average (Ra) of from 1 to 200 micrometers containing a dispersion of minute layered particulates in a polymer binder. The invention also provides a back-lighted imaging media, a liquid crystal display component and device, and method of making them. The invention provides an optical element containing the layered particlulate materials which provide improved haze while maintaining a high light transmission.

DETAILED DESCRIPTION OF THE INVENTION

The invention has numerous advantages over prior practices in the art. The invention provides an optical element such as a light diffuser, light guide or a focusing film with layered materials. The layered materials provide transmitted light scattering while maintaining high light tranmission because of the relative low addition of the layered materials to the optical feature. Further, the addition of the layered materials provides a dual optical function. For example, layered materials addition to a prism sheet provides both light shaping and light diffusion while reducing the morie pattern caused by the ordered structure of the prism film. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The nanocomposite element useful in the invention can be easily changed to achieve the desired diffusion and light transmission requirements for many liquid crystal devices thus allowing the invention materials to be responsive to the rapidly changing product requirements in the liquid crystal display market.

The invention eliminates the need for an air gap between prior art light diffusers that contain a rough surface and the brightness enhancement films used in liquid crystal display devices. The elimination of the air gap allows for the optical element to be adhesively bonded to other film components in the liquid crystal display making the unit lighter in weight and lower in cost.

The invention materials do not contain inorganic particles typical for prior art voided polymer films that cause unwanted scattering of the back light source and reduce the transmission efficiency of the liquid crystal display device. Further, the elastic modulus and scratch resistance of the diffuser is improved over prior art cast coated polymer diffusers rendering a more robust diffuser during the assembly operation of the liquid crystal device.

The present invention is an article, which uses layered particulates or materials such as smectite clay, preferably intercalated with an organic material having a hydrophilic component, and more preferably an additional oleophilic component. The aforesaid organic material can comprise a surfactant, an ethoxylated alocohol and/or a block co-polymer. The intercalated clay creates several index of refraction changes which diffuse visible light. The addition of the nano-composite material to optical element such as a lens improves the mechanical strength of the polymer element thereby increasing the scratch resistance of the sheet and improving the stiffness of the sheet allowing thinner, lower weight materials to be used. Thinner, lower weight materials reduce the weight and size of display devices allowing devices to be made smaller and lighter in weight. The intercalated clay materials useful in the invention also improves the thermal properties of the base polymer making the invention materials more thermally and optically stable at temperatures encountered in a hot car or in a military vehicle such as a tank. Thermal and optical stability increase the environmental range in which display devices can be utilized. These and other advantages will be apparent from the detailed description below.

Roughness average is the arithmetic average height calculated over the entire measured array. The arithmetic mean is the mean of the absolute values of the surface features from the mean plane. The measured array typically consists of 10 mm and the units are expressed in micrometers. Roughness average can be measured by contact stylus or laser methods.

"Minute" layered particulate materials means an inorganic phase, such as a smectite clay, where at least one dimension of the particle, typically the layer thickness, is in the range of 0.1 to 100 nm on a numerical average basis. "Basal plane" means the (001) plane of the layered material as commonly defined in x-ray crystallography and "basal plane spacing" means the interlayer distance between nearest equivalent basal planes, on a numerical average basis.

The term "LCD" mean any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers.

"Nanocomposite" shall mean a composite material wherein at least one component comprises an inorganic phase, such as a smectite clay, with at least one dimension in the 0.1 to 100 nanometer range. "Plates" shall mean particles with two dimensions of the same size scale and is significantly greater than the third dimension. Here, length and width of the particle are of comparable size but orders of magnitude greater than the thickness of the particle.

"Layered material" shall mean an inorganic material such as a smectite clay that is in the form of a plurality of adjacent bound layers. "Platelets" shall mean individual layers of the layered material. "Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5–line 23, col. 7).

"Intercalant" shall mean the aforesaid foreign molecule inserted between platelets of the aforesaid layered material. "Exfoliation" or "delamination" shall mean separation of individual platelets in to a disordered structure without any stacking order. "Intercalated" shall refer to layered material that has at least partially undergone intercalation and/or exfoliation. "Organoclay" shall mean clay material modified by organic molecules.

The minute layered particulate materials h useful in the invention have a layer thickness dimension in the range of from 0.1 to 100 nm. and typically from 0.5 to 10 nm. The average basal plane separation is desirably in the range of from 0.5 to 10 nm, preferably in the range of from 1 to 9 nm, and typically in the range of from 2 to 5 nm.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of simple optical structures to broaden the light all directions. Prior art methods for diffusing LCD back light include layering polymer films with different indexes of refraction, embossing a pattern onto the film, or coating the film with matte resins or beads.

The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means achieve this directionality. This patent focuses solely around light diffusion applications to evenly disperse light.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets in which the minor lenses are formed randomly on top of. "Minor lenses" mean lenses smaller than the major lenses that are formed on the major lens. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, offset from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, or that the direction of the peak light transmission is not along the direction $\theta=0°$, but is in a direction non-normal to the surface. There are least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

In order to provide an optical element that both directs light and diffuses light an optical element comprising substrate with a surface feature having an Ra from 1 to 200 micrometers containing a dispersion of minute layered materials. The surface features such as prisms for light directing, lenses for light focusing or complex lenses for light diffusion preferably contain a dispersion of minute layered particulates. The layered materials provide small index of refraction changes in the optical feature of the invention and cause transmitted light to be diffused. Further, the addition of the layered materials provides improved mechanical properties such as elastic modulus and scratch resistance. The layered materials useful in the invention also improves the thermal property of the polymer optical feature providing improved resistance to high temperature conditions found in a typical duty cycle of a LCD display. In a preferred embodiment of the invention, the layered materials useful in the invention are integral to the optical feature; that is the layered materials are contained within the optical feature.

In a preferred embodiment of the invention, the surface features are ordered. By providing an ordered surface features, light directing and light guiding can be achieved by the optical element of the invention. In another preferred embodiment of the invention, the surface features are random. By providing a random surface features, light diffusion can be achieved by the optical element of the invention. Further, a random surface features has been shown to reduce unwanted optical patterns such as morie that might result from an ordered surface features.

In another preferred embodiment of the invention, the surface features are on both the top and bottom of the optical element. By providing surface features on the top and bottom of the optical element, several different optical functions can be preformed utilizing one sheet. For example, the top side of the optical element could contain a prism structure while the bottom side contains a diffuser feature allowing the film to both direct and diffuse transmitted light energy.

In a more preferred form, the optical element of the invention has a surface roughness between 5 and 50 micrometers. This range has been shown to accomplish many significant optical functions such as light directing and light diffusion.

In preferred embodiment, the surface feature of the invention comprises a prism. Prism structures are well known and efficiently increase the brightness of the transmitted light by rejecting light energy that is obliquely incident to the surface. The addition of the minute layered materials to prism surface features provide both increased brightness and haze allowing for the reduction of Moire patterns created by the linear orientation of the prisms.

In another preferred embodiment, the surface feature of the invention comprises a corner cube. Corner cube surface features are well known and reduce glare of unwanted ambient light. The addition of the minute layered materials to corner cube features has been shown to further reduce the glare and increase the hardness of the corner cubes thus reducing increasing scratch resistance.

In another preferred embodiment of the invention, the surface feature comprises a linear array of curved surfaces. Curved surfaces are known to focus and change the direction of transmitted light. The addition of the minute layered materials to linear arrays of curved surfaces increases the hardness of the curved surfaces and provides light diffusing allowing the linear array to focus diffuse light.

In another preferred embodiment of the invention surface feature comprises complex lenses. Complex lenses are lens structures that have multiple curved random surfaces and have been shown to be very efficient light diffusers. The addition of the minute layered materials to the complex lenses increases the lens hardness, temperature resistance to temperatures encountered interior automobiles during the summer months and haze. The addition of the minute layered materials to the complex lenses has also been shown to further increase the spread of the light allowing the invention materials to efficiently diffuse transmitted light for wide angle viewing conditions such as LCD television.

Preferably, the complex lesnes have an average frequency in any direction of between 4 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are most preferred. It has been shown that an average frequency of between 22 and 6 complex lenses provide efficient light diffusion and can be efficiently manufactured utilizing cast coated polymer against a randomly patterned roll.

In another preferred embodiment of the invention, the surface feature comprises a micro lens with at least one curved and one flat surface. The micro lens with at least one curved and one flat surface has been shown to efficiently increase the brightness of the transmitted light by rejecting light energy that is obliquely incident to the surface. The addition of the minute layered materials to lens features provide both increased brightness and haze allowing for the reduction of Moire patterns.

The optical element preferably has a light transmission greater than 80%. By providing light transmission greater than 80%, little light energy is lost by absorption, scattering or reflection allowing display devices to efficiently utilize the light energy generated by the back light assembly. Further, because the invention materials have a low light scattering coefficient, they allowing most of the incident light to be transmitted.

The optical element preferably has a haze greater than 50%. A haze value greater than 50% provides efficient light diffusion and has been shown to significantly reduce unwanted optical patterns caused by ordered surface features such as linear prisms. In another embodiment of the invention, the optical element has a haze less than 10%. A haze value less than 10%, has been shown to significantly reduce glare from ambient light sources and provide sufficient light diffusion for a external diffuser for example. Further, the addition of the layered materials also improves the scratch resistance of the surface features allowing the invention materials to withstand stylus impressions for a PDA.

The layered materials are preferably integral to the surface features, that is contained in the volume of the geometrical surface feature. For example, for a prism feature, the layered materials would be contained within the volume of the prism surface feature. Integral layered materials can be compounded into polymers for subsequent melt stream formation or UV coating. In another preferred embodiment, the layered materials are contained in a layer adjacent to the surface features. The layered materials may be coated in a layer on top of the surface features or be in a layer below the surface features. By applying the layered materials in a layer below the surface features, specular light can be diffused before the surface feature. For example, a layer of layered materials can be applied to a web and prism surface features can be applied to the layer containing the layered materials eliminating the bottom diffuser common to many LC devices.

In another embodiment of the invention the optical element contains an optical spacer to provide a air gap, specified focal length and scratch and impact resistance. An optical element containing a rough surface having a roughness average equal to at least 5 micrometers wherein the rough surface contains at least two roughness populations in which the at least two populations vary by at least 8 micrometers is preferred. The optical element with two roughness populations provides at least one functional optical surface such as a light diffuser or light guide and another population that provides spacing in an optical system consisting of more than one optical component. By providing at least one roughness population that is higher than the others, the higher population provides the optical contact with other optical components while the other roughness population provides the optical utility such as light direction or light diffusion. Further, the two populations preferably vary by at least 8 micrometers because spacing less than 5 micrometers can result in unwanted light interference patterns.

Precision control of the air gap between the optical element of the invention and other optical components can greatly improve the efficiency and the variability of the optical element in an optical system. An example is visible light diffusion films containing an integral optical spacer. By providing an optical spacer between a surface diffuser and other optical components, the spread of the diffused light into other optical components can be specified and controlled by the height of the optical spacer compared to the light diffusing element. A specular light source, such as a laser, can be surface diffused into a narrow cone without the use of a spacer and can be surfaced diffused into a broad cone using a spacer that is 5 to 20 times larger than the diffusion element. A narrow light diffusion cone will tend to provide narrow viewing angle in an LC device while a broad cone will provide a larger viewing angle. Both narrow cone diffusers and broad cone diffusers have utility depending on the light diffusion application.

The optical element of the invention preferably comprises a geometrical spacer. A geometrical spacer, greater in height that the functional optical element, provides a precise air gap when used in combination with other optical components such as brightness enhancement films and polarizing films. A geometrical shape provides mechanical and optical utility for both reflected and transmitted light energy. In a preferred embodiment of the invention, the geometric spacer useful in the invention comprises a cylinder. A cylinder provides for specular light transmission and is impact resistant. Further, the end of the cylinder provides excellent contact points when the optical element of the invention is used in combination with other optical components.

A surface feature with an elastic modulus greater than 500 MPa is preferred. An elastic modulus greater than 500 MPa allows for the surface feature to be laminated with a pressure sensitive adhesive for combination with other optical webs materials. Further, because the surface feature is mechanically tough, the light diffuser is better able to with stand the rigors of the assembly process compared to prior art cast diffusion films, which are delicate and difficult to assemble.

Surface features preferably are applied to transparent thermoplastic polymers. Preferred polymeric polymers include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Preferred polyesters for the transparent polymeric film useful in the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

The surface features useful in the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferred polyvinyl resins include polyvinyl chloride, poly (vinyl acetal), and mixtures thereof. Copolymers of vinyl resins can also be utilized. Preferred polyesters for the complex lens useful in the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Polycarbonates are most preferred because they have a high light transmission, have good strength and surface properties and have a high index of refraction compared to other polymers.

Addenda is preferably added to the surface feature to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1–4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The layered materials suitable for this invention can comprise any inorganic phase desirably comprising layered materials in the shape of plates with significantly high aspect ratio. However, other shapes with high aspect ratio will also be advantageous, as per the invention. The layered materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4\cdot 2H_2O$, $CaPO_4CH_3\text{---}H_2O$, $MnHAsO_4\text{---}H_2O$, and $Ag_6Mo_{10}O_{33}$. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred smectite clays include montmorillonite, hectorite and hydrotalcites, because of commercial availability of these materials.

The aforementioned particles can be natural or synthetic such as smectite clay. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the particles should have a lateral dimension of between 0.01 µm and 5 µm, and preferably between 0.05 µm and 2 µm, and more preferably between 0.1 µm and 1 µm. The thickness or the vertical dimension of the particles can vary between 0.5 nm and 10 nm, and preferably between 1 nm and 5 nm. The aspect ratio, which is the ratio of the largest and smallest dimension of the particles should be between 10:1 and 1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects due to deleterious light scattering, and can be abrasive to processing, conveyance and finishing equipment as well as to other components.

The concentration of particles in the optical component of the invention can vary as per need; however, it is preferred to be <10% by weight of the binder. Significantly higher amounts of clay can impair physical properties of the optical component by rendering it brittle, as well as difficult to process. On the other hand, too low a concentration of clay may fail to achieve the desired optical effect. It is preferred that the clay concentration be maintained between 1 and 10% and more preferred to be between 1.5 and 5% for optimum results.

The particle materials, generally require treatment by one or more intercalants to provide the required interlayer swelling and/or compatibility with the matrix polymer. The resulting interlayer spacing is critical to the performance of the intercalated layered material in the practice of this invention. As used herein the "inter-layer spacing" refers to the distance between the faces of the layers as they are assembled in the intercalated material before any delamination (or exfoliation) takes place. The preferred clay materials generally include interlayer or exchangeable cations such as Na+, Ca+2, K+, and Mg+2. In this state, these materials do not delaminate in host polymer melts regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt.

In the present invention, the particles are preferably intercalated by swelling agent(s) or intercalant(s), to increase interlayer distances to the desired extent. In general, the interlayer distance should be at least about 0.5 nm, preferably at least 2 nm, as determined by X-ray diffraction. The clay to swelling agent or intercalant weight ratio may vary from 0.1:99.9 and 99.9:01, but preferably between 1:99 and 90:10 and more preferably between 20:80 and 80:20.

The swelling agent or intercalant can be an organic material preferably comprising a hydrophilic component, and more preferably also comprising an oleophilic component. It is believed that the hydrophilic component participates in intercalation and the oleophilic component participates in compatibilization of the smectite clay in a suitable matrix or binder polymer. The aforesaid organic material can comprise a surfactant, a block co-polymer and/or an ethoxylated alocohol. In a most preferred embodiment, the aforesaid organic material is a block copolymer or an ethoxylated alcohol, similar to those disclosed in dockets 82,859; 82,857; and 82,056, incorporated herein by reference.

The preferred block copolymers useful in the invention are amphiphilic and have a hydrophilic and an oleophilic component. Further, the block copolymers useful in the invention can be of the two block or "A-B" type where A represents the hydrophilic component and B represents the oleophilic component or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One presently preferred class of polymeric components that is useful for the hydrophilic component in this invention is poly(alkylene oxides) such as poly(ethylene oxide). The term poly(alkylene oxides) as used herein includes polymers derived from alkylene oxides such as poly(ethylene oxides) including mixtures of ethylene and propylene oxides. The most preferred is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides such as poly (ethylene oxides) including mixtures of ethylene and propylene oxides. The most preferred is poly(ethylene oxide), mainly because of its effectiveness in the present invention, its commercial availability in a range of molecular weights and chemistries affording a wide latitude in the synthesis of the block copolymers.

Poly(ethylene oxides) are well known in the art and are described in, for example U.S. Pat. No. 3,312,753 at column 4. Useful (alkylene oxide) block contains a series of interconnected ethyleneoxy units and can be represented by the formula:

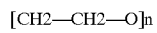

wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly (vinylpyrrolidone), poly(vinyl alcohol), polyacrylamides, polyacrylonitrile, polysaccharides and dextrans.

The oleophilic component of the block of the polymers useful in the present invention can also be selected from many common components. The oleophilic component is characterized in that it is at least partially miscible in the binder polymer useful in the invention, and/or interacts with the binder polymer, for example, through transesterfication. In the case of a polyester binder, the oleophilic block comprises polyester. Exemplary oleophilic components can be derived from monomers in such as: caprolactone; propiolactone; β-butyrolactone; δ-valerolactone; ε-caprolactam; lactic acid; glycolic acid; hydroxybutyric acid; derivatives of lysine; and derivatives of glutamic acid.

Other useful oleophilic components can be derived from α, β-ethylenically unsaturated monomers, such as olefins, styrenics and acrylates. Polymeric forms would include polycaprolactone; polypropiolactone; poly β-butyrolactone; poly δ-valerolactone; poly ε-caprolactam; polylactic acid; polyglycolic acid; polyhydroxybutyric acid; derivatives of polylysine; and derivatives of polyglutamic acid, polyolefins, polystyrene, polyacrylates, and polymers of α, β-ethylenically unsaturated monomers, such as olefins, styrenics and acrylates. Preferred components comprise polyester, polycaprolactone, polyamide, and polystyrene, because of their effectiveness in the present invention and compatibility with a wide rage of engineering thermoplastics.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. A preferred matrix compatible block comprises 50 to 500 monomer repeat units of caprolactone with a matrix polymer of polyester. Another preferred matrix compatible block comprises 25 to 100 monomer repeat units of ethylene with a matrix polymer of polyethylene. The preferred molecular weight ranges are chosen to ensure ease of synthesis and processing under a variety of conditions.

Ethoxylated alcohols are a class of nonionic surfactants derived from very long chain, linear, synthetic alcohols. These alcohols are produced as functional derivatives of low molecular weight ethylene homopolymers. These when reacted with ethylene oxide or propylene oxide yield condensation products known as oxylated alcohols. The average chain length of the hydrocarbon portion can be between 12 and 106 carbons but is not restricted to this. It is preferably in the 26–50 carbon range.

The relative efficiency of the hydrophilic and oleophilic portion of the ethoxylated alcohol molecule is controlled by changing the starting alcohol, changing the amount of ethylene oxide, or using propylene oxide. The ethylene oxide or propylene oxide content can range from 1 to 99% by weight, preferably 10–90% by weight. Thus the surfactant chemistry can be widely tailored for use in a wide range of applications. Typically they have been used as dispersion aids for pigments in paints, coatings and inks. They have been used as mold release components for plastics, nonionic emulsifiers, emulsifiers/lubricants for textile processing and finishing. The present invention finds that oxylated alcohols, especially ethoxylated alcohols, may be used for intercalation of smectite clays. These intercalated clays are easily dispersed in commercial polyolefin polymers and the degree of intercalation produced by the ethoxylated alcohols was not found to be reduced after dispersion.

The smectite clay and the intercalant, preferably the block copolymer and/or the ethoxylated alcohol, useful in the invention can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying.

Of the aforesaid methods, the one involving melt blending is preferred, for ease of processing.

In a preferred embodiment of the invention the clay, together with any optional addenda, is melt blended with the intercalant useful in the invention in a suitable twin screw compounder, to ensure proper mixing. An example of a twin screw compounder used for the experiments detailed below is a Leistritz Micro 27. Twin screw extruders are built on a building block principle. Thus, mixing of additives, residence time of resin, as well as point of addition of additives can be easily changed by changing screw design, barrel design and processing parameters. The Leistritz machine is such a versatile machine. Similar machines are also provided by other twin screw compounder manufacturers like Werner and Pfleiderrer, and Berstorff, which can be operated either in the co-rotating or the counter-rotating mode. The Leistritz Micro 27 compounder may be operated in the co-rotating or the counter rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives then screw design needs to be appropriately configured. The preferred mode of addition of clay to the block copolymer is through the use of the side stuffer, to ensure intercalation of the clay through proper viscous mixing and to ensure dispersion of the filler through the polymeric phase as well as to control the thermal history of the additives. In this mode, the intercalant is fed using the main resin feeder, and is followed by the addition of clay through the downstream side stuffer. Alternatively, the clay and the intercalant can be fed using the main feeders at the same location.

In yet another embodiment of the invention, the clay, the intercalant and the matrix or binder polymer together with any optional addenda are melt blended in a suitable twin screw compounder. One of the preferred modes of addition of clay and the intercalant to the polymer is by the use of side stuffers to ensure intercalation of the clay through proper viscous mixing; the intercalant first followed by the addition of clay through the downstream side stuffer or vice versa. The mode of addition will be determined by characteristics of the intercalant. Alternatively, the clay and the intercalant are premixed and fed through a single side stuffer This method is particularly suitable if there is only one side stuffer port available, and also there are limitations on the screw design. Also preferred are methods where the clay and intercalant are fed using the main feeders at the same location as the binder resin.

In another preferred embodiment of the invention, the clay, together with any optional addenda, is melt blended with the intercalant useful in the invention using any suitable mixing device such as a single screw compounder, blender, mixer, spatula, press, extruder, or molder.

In the formation of an article comprising the intercalated clay useful in the invention, any method known in the art including those mentioned herein above can be utilized. The end product of the instant invention, comprising the clay, the intercalant and the binder polymer together with any optional addenda, can be formed by any suitable method such as, extrusion, co-extrusion with or without orientation by uniaxial or biaxial, simultaneous or consecutive stretching, blow molding, injection molding, lamination, solvent casting, coating, drawing, spinning, or calendaring.

The surface features of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss. The tacky adhesive is preferably those having a refractive index close to that of the oriented film to suppress the interfacial reflection loss of light.

The surface features may also be used in conjunction with another light diffuser, for example a bulk diffuser, a lenticular layer, a beaded layer, a surface diffuser, a holographic diffuser, a micro-structured diffuser, another lens array, or various combinations thereof. The optical element disperses, or diffuses, the light, thus destroying any diffraction pattern that may arise from the addition of an ordered periodic lens array. The optical element may be positioned before or after any diffuser or lens array.

The optical element of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The optical element of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The optical element of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or a metal oxide or filler.

The optical element of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n^*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.^*d$ since the level depends upon the application of the film.

In the manufacturing process for this invention, preferred optical element polymers are melt extruded from a slit die. In general, a T die or a coat hanger die are preferably used.

The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

The optical element and the geometrical spacer useful in the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses useful in the invention to be formed into rolls thereby lowering the manufacturing cost for the diffusion lenses. Further, cast coating polymer has been shown to more efficiently replicate the desired complex lens geometry compared to embossing and vacuum forming.

In another embodiment, polymer beads of differing mean diameters are preferably coated in a matrix on a polymer transparent web. The mean diameter difference between the two populations of beads provides the desired geometrical spacing between the optical element of the invention and other optical components. For example, two populations of polystyrene polymer beads coated in a PVA matrix, one at 10 micrometers and the other at 50 micrometers, provides a 40 micrometer geometrical spacer on the surface of the transparent polymer web.

The invention may be used in conjunction with any liquid crystal display devices, typical arrangements of which are described in the following. Liquid crystals (LC) are widely used for electronic displays. In these display systems, a LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The optical element of the present invention can even the lightness of a liquid crystal display device across the display because the film has excellent light-scattering properties to expand the light to give excellent visibility in all directions. Although the above effect can be achieved even by the single use of such optical element, plural number of films may be used in combination. The homogenizing optical element may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing optical element of the present invention placed between the light source and the detector can eliminate from the output of the light source any trace of the filament structure and therefore causes a homogenized output which is identical from light source to light source.

The optical elements may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film may be formed by applying a reflection layer composed of e.g. a metallic film to the optical element of the present invention can be used e.g. as a retroreflective member for a traffic sign. It can be used in a state applied to a car, a bicycle, or person, for example.

The optical elements of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A optical element of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The optical elements of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The optical elements of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The optical elements of the present invention may also be used to diffuse light illuminating artwork. The transparent polymeric film diffuser provides a suitable appropriately sized and directed aperture for depicting the artwork in a most desirable fashion.

Further, the optical element of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The optical element of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction. The diffuser acts to spread the light to increase viewing angle.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

EXAMPLES

In this example, complex surface light diffusion lenses containing layered particulates useful in the invention were created by extrusion casting a extrusion grade polyester polymer blend against a patterned chill roll containing the complex lens geometry. The patterned polyester polymer, in the form the complex lens was then transferred to a polyester web material thereby forming a light diffuser with complex surface lenses containing layered particulates. This example will show that complex surface lenses formed on a transparent polymer web material provide exceptional light diffusion compared to complex polymer diffusion lenses without the addition of layered particulates and a prior art light diffuser utilizing a dispersion of spherical beads in an acrylic matrix. Further, it will be obvious that the light diffuser will be low in cost and have mechanical properties that allows for insertion into LC devices.

A patterned roll was manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the roll per area is determined by the bead size and the pattern depth. Larger bead diameters and deeper patterns result in fewer numbers of features in a given area. The complex lens patterned roll was manufactured by starting with a steel roll blank and grit blasted with size 14 grit at a pressure of 447 MPa. The roll was then chrome platted. The resulting complex lenses on the surface of the roll were convex.

The following materials were used in making the examples of the invention.

Minute Layered Materials:
Layered Particulate:

Na Cloisite clay, which is a natural montmorillonite, supplied by Southern Clay Products. The particles have a minute dimension or thickness numerical average of 1–5 nm and an average basal plane spacing in the range of 1–5 nm.

Polyester Binder:

A blend of two types of polyester resins were used as a binder for dispersion of minute layered particulates, which were present on an average of 2 wt % in the binder:

Polyester Polymer:

A blend of two types of polyester resins were used as a binder for dispersion of minute layered particulates into the complex lens shape:
13. PET (polyethylene terephthalate) 7352
14. PETG (polyethylene terephthalate—glycolate) a fully amorphous polyester, both supplied by Eastman Chemicals.

Intercalant used was the Following Copolymer:
PEO-b-PCL, a block copolymer poly (ethylene oxide-b-caprolactone), with
PEO: PCL molecular weight ratio of 5000:20000.

Sample Preparation & Testing:

The polyester, clay and the intercalant were compounded in different ratios in a 27 mm in diameter twin screw Leistritz compounder with a functionary length of 40 diameters. The compounding was carried out at 400 rpm at 260° C. The compounded materials were further blended with more polyester and extruded from a coat hanger slot die onto a 100 micrometer transparent oriented web polyester web with a % light transmission of 97.2%. The polyester cast coating coverage was 25.88 g/m$^2$.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers. The structure of the diffusion sheets containing the layered particulates was as follows, ---
Formed polyester lenses containing
2% layered particulates
Transparent polyester base
---

Control material was created by cast coating the polyester blend from above onto the same roller as the invention roll without the layered particulates. The resulting geometry was similar to the invention.

The two diffusion sheets containing formed polymer lenses from above (invention and control) and a prior polymer light diffuser containing 8 micrometers polymer beads in an acrylic binder layer coated on a polyester web material were measured for % light transmission, % diffuse light transmission, % specular light transmission and % diffuse reflectance.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention, control and prior art materials are listed in Table 1 below.

TABLE 1

| | Sample | | |
|---|---|---|---|
| | 1<br>Invention<br>(with layered<br>particulates) | 2<br>Control<br>(without layered<br>particulates) | 3<br>Control<br>(Prior Art polymer<br>beads in matrix) |
| Total transmission measured at 500 nm | 91.1 | 91.7 | 66.7 |
| Diffuse transmission measured at 500 nm | 92.2 | 85.2 | 65.7 |
| Spectral transmission measured at 500 nm | 2.9 | 6.5 | 1.0 |
| Diffuse reflectance measured at 500 nm | 4.3 | 7.6 | 33.3 |

As the data above clearly indicates, complex polymer lenses containing layered particulates formed on the surface of a transparent polymer provided excellent light diffusion and % transmission. The diffuse light transmission of 92.2% for the invention materials was significantly better than the prior art materials (65.7%). The complex lens useful in the invention provided significantly more curved surface area for transmitted light diffusion compared to a single lens (one curved surface) and the prior art materials (one curved surface). Diffuse light transmission is important factor in the quality of a LC device in that the diffusion sheet must mask the pattern of the light guide common to LC devices. The total light transmission of the invention of 91.1% is significantly improved over the prior art materials and slightly lower than the complex diffusion lenses without the layered particulates. However, the small loss in light transmission (0.6%) has more that offset by the large increase in specular light diffusion (7.0%) allowing the invention materials to more efficiently diffuse the specular light.

Integrating all of the measurements in Table 1, the invention material of Sample 1 combined high total transmission with high diffuse light transmission. This created a film that masked the pattern of the light guide while allowing most of the light through the film to enable a brighter LC display. Sample 2 had a high transmission value creating a bright LC display, but lower diffuse transmission value. In Sample 3, most of the light exiting the film was diffuse thus masking the pattern of the light guide. Though the light exiting was almost totally diffuse, the total transmission measurement was low blocking light and creating an unacceptably dark display. Light through Sample 3 was also wasted by a large percent of reflection.

Further, because the invention materials contained layered materials, the materials have a higher (14%) elastic modulus compared to complex lenses without the layered particulates. The light diffusion surface features, since they contained layered particulates, had an increase in Tg of 9.1 degrees C. compared to the polyester light diffusion lenses without the layered particulates allowing the invention materials to be more thermally stable at high temperatures such as those encountered in an automobile interior during the summer months or a battle field LCD display in a tank.

While this example was directed at the addition of layered materials to a light diffusion surface feature, the layered materials may also be added to other surface feature which have optical utility such as light directing features, prism features, anti-glare features, light focusing features and light defracting features. Further, while this example was primarily directed toward the use of thermoplastic light diffusion materials for LC devices, the materials useful in the invention have value in other diffusion applications such as back light display, imaging elements containing a diffusion layer, a diffuser for specular home lighting and privacy screens, image capture diffusion lenses and greenhouse light diffusion.

While this example was primarily directed toward the use of thermoplastic light diffusion materials containing geometrical spacers for LC devices, the materials useful in the invention have value in other diffusion applications such as back light display, imaging elements containing a diffusion layer, a diffuser for specular home lighting and privacy screens, organic light emitting displays, image capture diffusion lenses and greenhouse light diffusion. The geometrical spacers also have value when used with other optical elements such as light directors, prism sheet, light guides and color filters.

What is claimed is:

1. An optical element comprising substrate with a surface feature having a roughness average (Ra) of from 1 to 200 micrometers containing a dispersion of minute layered particulates in a polymer binder, wherein said layered particulates comprise smectite clay or a layered double hydroxide, wherein said optical element exhibits a light transmission greater than 80% and a haze greater than 50%.

2. The optical element of claim 1 wherein said optical element has a top and bottom surface containing said surface feature.

3. The optical element of claim 1 wherein the roughness average is between 5 and 50 micrometers.

4. The optical element of claim 1 wherein said surface feature is ordered.

5. The optical element of claim 1 wherein said surface feature is random.

6. The optical element of claim 1 wherein said surface feature comprises a prism.

7. The optical element of claim 1 wherein said surface feature comprises a corner cube.

8. The optical element of claim 1 wherein said surface feature comprises a linear array of curved surfaces.

9. The optical element of claim 1 wherein said surface feature comprises complex lenses.

10. The optical element of claim 1 wherein said surface feature comprises lenses with at least one curved surface and one planner surface.

11. The optical element of claim 1 wherein said optical element exhibits a haze less than 10%.

12. The optical element of claim 1 wherein said minute layered particulates are integral to the surface feature.

13. The optical element of claim 1 wherein said minute layered particulates are in a layer adjacent to the surface feature.

14. The optical element of claim 1 wherein transmitted light has greater than 200 index of refraction changes of at least 0.02 in the direction of light travel.

15. The optical element of claim 1 wherein said layered particulates have an aspect ratio aspect ratio of the largest to the smallest dimension of the particulates $\geq 10:1$.

16. The optical element of claim 1 wherein said layered particulates have an aspect ratio between 10:1 and 1000:1.

17. The optical element of claim 1 wherein said layered particulates are present in an amount between 1 and 10% by weight of said binder.

18. The optical element of claim 1 wherein said layered particulates are present in an amount between 1.5 and 5% by weight of said binder.

19. The optical element of claim 1 wherein said layered particulates comprise smectite clay.

20. The optical element of claim 1 wherein said layered particulates comprise layered double hydroxide.

21. The optical element of claim 1 wherein said layered particulates comprise intercalated layered materials.

22. The optical element of claim 19 wherein said smectite clay comprises synthetic smectite clay.

23. The optical element of claim 19 wherein said smectite clay comprises organoclay.

24. The optical element of claim 19 wherein said smectite clay comprises intercalated smectite clay.

25. The optical element of claim 24 wherein said intercalated smectite clay comprises oxylated alcohol intercalated in smectite clay.

26. The optical element of claim 25 wherein said oxylated alcohol comprises ethoxylated alcohol.

27. The optical element of claim 1 wherein said binder comprises at polyester.

28. The optical element of claim 1 wherein said binder comprises polyolefin.

29. The optical element of claim 1 wherein said binder comprises polycarbonate.

30. The optical element of claim 1 wherein the elastic modulus of the optical element is greater than 500 MPa.

31. The optical element of claim 1 wherein the impact resistance of the optical element is greater than 0.6 GPa.

32. The optical element of claim 1 wherein said layered particulates are present in an amount between 0.1 and 1% by weight of said binder.

33. The optical element of claim 1 wherein the optical component comprises two or more layers.

34. The optical element of claim 24 wherein said intercalated smectite clay comprises block copolymer intercalated in smectite clay.

35. The optical element of claim 24 wherein said block copolymer further comprises a hydrophilic block that intercalates clay.

36. The optical element of claim 24 wherein said block copolymer further comprises an oleophilic block.

37. The optical element of claim 35 wherein said hydrophilic block comprises at least one member selected from the group consisting of poly(alkylene oxide), poly 6, (2-ethyloxazolines), poly(ethyleneimine), poly (vinylpyrrolidone), poly (vinyl alcohol), polyacrylamides, polyacrylonitrile, polysaccharides, and dextrans.

38. The optical element of claim 35 wherein said hydrophilic block comprises poly(ethylene oxide).

39. The optical element of claim 36 wherein said oleophilic block comprises at least one member selected from the group consisting of polycaprolactone, polypropiolactone, poly β-butyrolactone; poly δ-valerolactone; poly ε-caprolactam; polylactic acid; polyglycolic acid; polyhydroxybutyric acid; derivatives of polylysine; and derivatives of polyglutamic acid, polymers of α, β-ethylenically unsaturated monomers.

40. The optical element of claim 36 wherein said oleophilic block comprises polyester.

41. The optical element of claim 36 wherein said oleophilic block comprises polycaprolactone.

42. The optical element of claim 36 wherein said oleophilic block comprises polyamide.

43. The optical element of claim 36 wherein said oleophilic block comprises polystyrene.

44. The optical component of claim 1 wherein the minute particulate materials have a lateral dimension of 0.01 to 5 $\mu$m and a thickness of 0.5 to 10 nm.

45. The optical component of claim 1 wherein the layered minute particulate materials have a basal plane spacing of from 1 to 9 nm.

46. An optical element comprising substrate with a surface feature having a roughness average (Ra) of from 1 to 200 micrometers containing a dispersion of minute layered particulates in a polymer binder wherein said layered particulates comprise intercalated layered materials, and wherein said surface feature comprises lenses with at least one curved surface and one planar surface.

47. The optical element of claim 46 wherein said optical element has a top and bottom surface containing said surface features.

48. The optical element of claim 46 wherein the roughness average is between 5 and 50 micrometers.

49. The optical element of claim 46 wherein said optical element exhibits a light transmission greater than 80%.

50. The optical element of claim 46 wherein said optical element exhibits a haze greater than 50%.

51. The optical element of claim 46 wherein said layered particulates have an aspect ratio between 10:1 and 1000:1.

52. The optical element of claim 46 wherein said layered particulates are present in an amount between 0.1 and 1% by weight of said binder.

53. The optical component of claim 46 wherein the minute particulate materials have a lateral dimension of 0.01 to 5$\mu$m and a thickness of 0.5 to 10 nm.

54. The optical component of claim 46 wherein the layered minute particulate materials have a basal plane spacing of from 1 to 9 nm.

55. An optical element comprising substrate with a surface feature having a roughness average (Ra) of from 1 to 200 micrometers containing a dispersion of minute layered particulates in a polymer binder wherein said layered particulates comprise smectite clay or a layered double hydroxide.

56. The optical element of claim 55 wherein said optical element has a top and bottom surface containing said surface feature.

57. The optical element of claim 55 wherein the roughness average is between 5 and 50 micrometers.

58. The optical element of claim 55 wherein said optical element exhibits a light transmission greater than 80%.

59. The optical element of claim 55 wherein said optical element exhibits a haze greater than 50%.

60. The optical element of claim 55 wherein said layered particulates have an aspect ratio between 10:1 and 1000:1.

61. The optical element of claim 55 wherein said layered particulates comprise intercalated layered materials.

62. The optical element of claim 55 wherein said layered particulates are present in an amount between 0.1 and 1% by weight of said binder.

63. The optical component of claim 55 wherein the minute particulate materials have a lateral dimension of 0.01 to 5 $\mu$m and a thickness of 0.5 to 10 nm.

64. The optical component of claim 55 wherein the layered minute particulate materials have a basal plane spacing of from 1 to 9 nm.

* * * * *